United States Patent Office 2,773,009
Patented Dec. 4, 1956

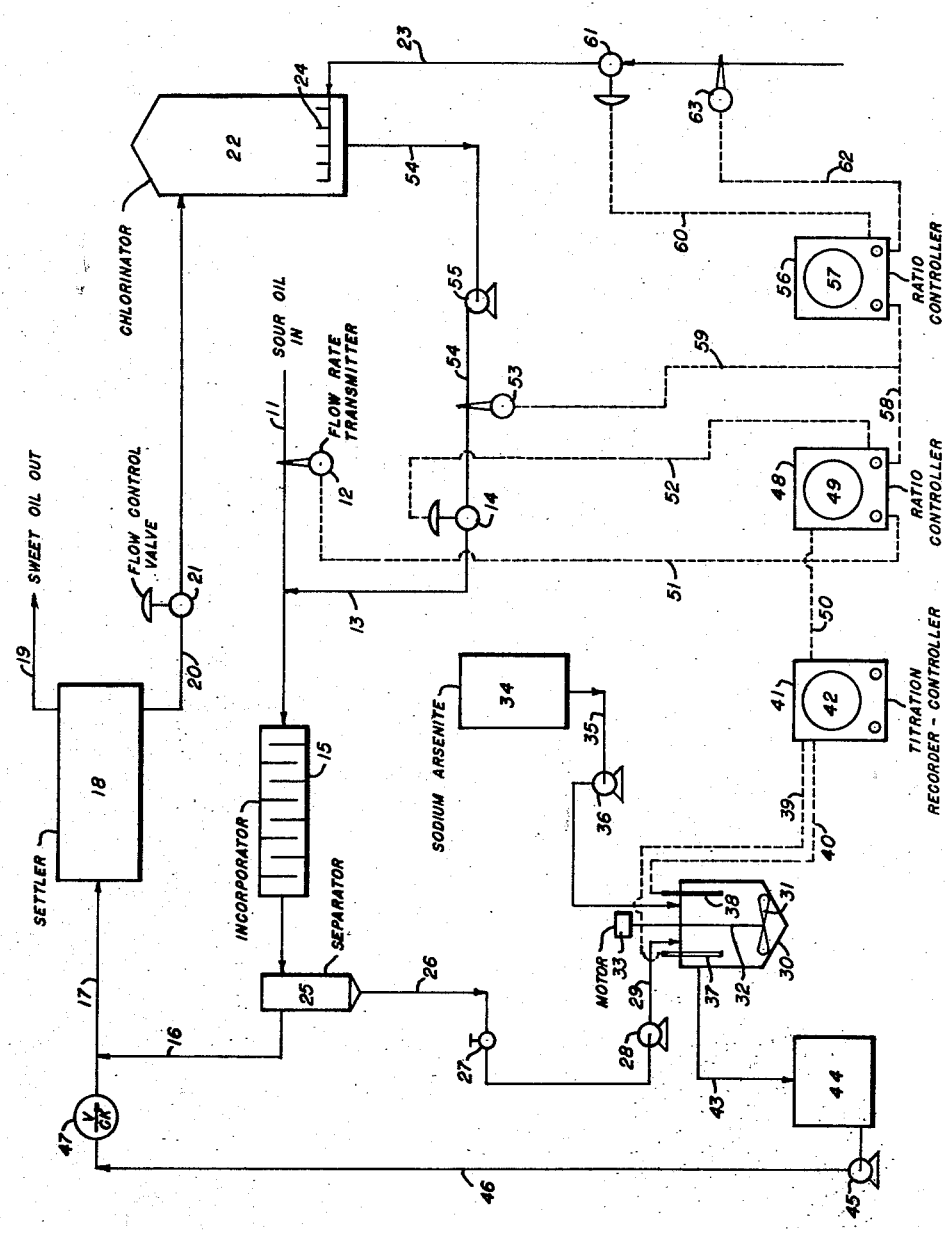

2,773,009

CONTROLLED HYPOCHLORITE SWEETENING PROCESS

Harold W. Earhart, Benjamin W. Thomas, and Mathis T. Waddell, Baytown, Tex., assignors, by mesne assignments, to Esso Research and Engineering Company, Elizabeth, N. J., a corporation of Delaware Application July 26, 1954, Serial No. 445,555

3 Claims. (Cl. 196—29)

The present invention is directed to improvements in the hypochlorite sweetening of sour hydrocarbon oils. Specifically, the invention is directed to a controlled method for sweetening sour hydrocarbon oils in which high alkalinity hypochlorite sweetening solutions are used. More specifically, the invention is directed to a method of controlling the hypochlorite content of a circulating treating solution.

The employment of high alkalinity hypochlorite sweetening solution is described in U. S. patents to Brandon et al. 2,550,668; to Love 2,581,117; to Waddell et al. 2,608,523; to Love 2,626,232; and to Linn et al. 2,631,121. These operations involve sweetening a sour oil, which may be a cracked naphtha containing phenolic compounds, and the like, by contacting the sour oil with a circulating solution containing between 50 and 250 grams per liter of sodium hydroxide, preferably above 90 grams, available chlorine normally in excess of 1 gram per liter and ordinarily in the range between 1 and 100 grams per liter, and varying amounts of sodium chloride. In the aforementioned operation, flow of the sour oil is continuous. The treating solution may be made up as a fresh batch and circulated, with addition of chlorine between contacts, until its alkali concentration drops below the desired level, and it is discarded and replaced by a fresh batch. Alternatively, the treating solution may be circulated and continuously maintained at operating strength by withdrawing a small part of the total solution and adding a corresponding amount of fresh hypochlorite solution, as specifically described, for example, in the Waddell et al. patent.

Presented in Table I below are inspections of representative portions of hypochlorite solution as used in the present invention. Solution A is a typical freshly made up solution; solution B is typical of spent solution discarded from the system after it has been exhausted in treating a stock such as oil A in Table II; and solution C is typical of a spent solution discarded from the system after it has been exhausted in treating a catalytic cracked naphtha.

Table I

| Solution | A | B | C |
|---|---|---|---|
| Inspection: | | | |
| Gravity, °Bé | 27 | 29 | 29 |
| Free NaOH, grams/liter | 250 | 65 | 65 |
| Organic acids, Vol. percent | None | 0 | 0.5 |
| Phenolics, Wt. percent | None | 0.04 | 0.6 |
| Total Sulfur, Wt. percent | None | 0.08 | 0.05 |
| Total Chlorides,[1] grams/liter | None | 132 | 132 |

[1] Mainly present as NaCl.

Presented in Table II below are inspections of typical sour oils which are suitably treated in the present invention.

Table II

| Oil | A | B |
|---|---|---|
| Inspections: | | |
| Gravity, °A. P. I | 70 | 46.6 |
| Engler Distillation— | | |
| Initial Boiling Point, °F | 86 | 169 |
| 50% Off, °F | 103 | 316 |
| Final Boiling Point, °F | 354 | 428 |
| Copper Number | 5–10 | 2–40 |
| Bromine Number | 40 | 25–35 |
| Phenolics, Wt. Percent | 0.0 | 0.01–0.06 |

Oil A, supra, is a mixture of pentanes and pentenes, recovered from catalytic and thermic cracking processes. Oil B, supra, is a typical naphtha obtained by admixing gasoline boiling range cuts from straight distillation of Coastal crude oil and from catalytic cracking of gas oil from such crudes.

In operations of the nature referred to, gaseous chlorine is injected, in a chlorination vessel, into a caustic solution having an initial NaOH content equivalent to 250 grams per liter and forms sodium hypochlorite, sodium chloride and water. From the chlorinator vessel, the sodium hypochlorite treating solution is pumped through an incorporator together with a sour oil to be treated and thence into settling drums for separation of the sweetened oil and spent hypochlorite, and finally the spent hypochlorite is returned to the chlorinator for refortification and re-use. After the sodium hydroxide content of the circulating solution has been reduced to about 50 grams per liter, the solution is replaced with fresh caustic solution.

In carrying out the aforementioned operations, the sweetening operation may be improved by contacting the sour oil with just the amount of sodium hypochlorite required to make a sweet product. When operating in this manner, the spent hypochlorite solution should contain no more than 0.1 to 1.0 gram of available chlorine per liter and preferably between 0.3 and 0.5 gram per liter. Operating to provide spent solutions of this content of available chlorine is advantageous because: (1) The decomposition of sodium hypochlorite with resulting loss of available chlorine is avoided. Spent hypochlorite solution decomposes when subjected to prolonged standing in settling drums. By maintaining the available chlorine content in the spent solution as low as possible, preferably about 0.3 gram per liter, this loss by decomposition is minimized. This decomposition is rapid if the spent solution contains sodium phenolates such as results when treating naphthas containing phenols. (2) A minimum amount of chlorine is consumed in sweetening and a minimum amount of chlorine-containing organic products is formed. (3) Where phenol-containing naphthas are treated, the minimum amount of sodium hypochlorite permits the sweetening reaction to proceed without substantial chlorination of phenols.

Heretofore in manually controlled operations, it was impractical to maintain the available chlorine content of the spent solution at a desirably low value. In manually controlled commercial operations it was often found that the available chlorine content of the spent solution would range as high as from 4 to 6 grams of chlorine per liter of said treating solution.

The "available chlorine," determined as stated, is a term well known to chemists. It may be defined as chlorine present in reducible form, and is expressed as the elementary chlorine equivalent. Thus, chlorine present in solution in the compound NaOCl is "available," whereas chlorine present in the compound NaCl is not "available."

In the present invention the difficulties of the operations supra are overcome by analyzing continuously the freshly spent circulating hypochlorite treating solution for its available chlorine content and employing the result of this analysis to control the treat so that no more than the required amount of available chlorine is brought into contact with the sour naphtha. Thus the present invention may be briefly described as a controlled continuous hypochlorite sweetening process in which sour hydrocarbon oils are contacted with an alkaline hypochlorite solution and the spent hypochlorite solution is then separated from the contacted hydrocarbons. A portion of the freshly spent solution is placed in an analytical system to obtain a signal which is a measure of the available chlorine content of the spent solution. Chlorine is added to another portion of the spent solution to fortify or reactivate same and the refortified or reactivated solution is then employed to contact additional quantities of the sour hydrocarbon oil, the chlorine being added and/or the flow of reactivated solution being regulated responsive to variations in said signal.

Said signal may suitably be obtained by any method by way of which a signal or impulse is obtained in analyzing solutions for available chlorine. It is preferred to obtain this impulse by adding an aqueous solution of a reducing agent to a portion of the spent hypochlorite solution and through a potentiometric system obtaining a voltage produced between suitable electrodes, such as platinum-calomel electrodes in the admixture of spent solution and alkaline reducing agent. This voltage may be employed to position or control valves which admit chlorine to the chlorinator and which control the flow of the re-activated hypochlorite solution, so that the concentration of available chlorine in the spent solution recovered from the treatment is in the desired range.

The invention will be further illustrated by reference to the drawing in which the sole figure represents a preferred mode.

Referring now to the drawing, a sour oil, which may be a cracked naptha containing phenols, is introduced into the system through line 11. This cracked naphtha may suitably be given a preliminary caustic wash with an aqueous solution to remove hydrogen sulfide which would cause abnormal consumption of hypochlorite. The sour naphtha in line 11 flows through a flow rate measuring and signal transmitting device 12 and has added to it a fresh or reactivated hypochlorite solution which is admitted into line 11 through line 13. The sour naphtha and the hypochlorite solution flow together into a mixing device or incorporator 15 which may be a baffle-type incorporator where intimate contact is obtained. The intimately contacted naphtha and hypochlorite solution leave incorporator 15 by line 16 which introduces same into line 17 and thence into a settler 18 which is of sufficient capacity to allow a residence time for separation by gravity of the spent solution from the treated oil. The sweetened naphtha is removed from the settler 18 by line 19 for use in blending purposes in motor gasoline and the like. The spent solution from settler 18 discharges by line 20 controlled by a flow control valve 21 suitably actuated by liquid level control means, not shown, into a chlorinator vessel 22 into which chlorine is introduced by line 23 through a spider or mixing device 24. The source of the chlorine and the introduction of the same will be described further.

As the mixture of contacted naphtha and hypochlorite solution flows through line 16, a small portion of the freshly spent solution is withdrawn into a small separator 25 and the freshly spent solution recovered in separator 25 is then discharged by line 26 controlled by valve 27 and thence into a pump 28 which is preferably a constant volume pump and which serves to discharge the freshly spent solution by line 29 into a titrating vessel 30 provided with a mixing device 31 which is rotated by shaft 32 on activating of a prime mover, such as electric motor 33.

A tank 34 is provided which contains an aqueous reducing solution, such as sodium meta-arsenite or sodium mercaptide, which is introduced from tank 34 by line 35 containing pump 36 which is preferably a constant volume pump, into titrating vessel 30. Titrating vessel 30 is provided with a platinum electrode 37 and a calomel electrode 38 which are connected, respectively, by electrical connecting means 39 and 40 to a titrator in the form of a recorder-controller 41 which is provided with a chart 42 on which the electrical impulse from the voltage generated between the electrodes 37 and 38 is displayed as a value indicative of the available chlorine content of the freshly spent hypochlorite solution introduced by way of line 26, pump 28 and line 29 into vessel 30.

Controlled amounts of the freshly spent hypochlorite solution and the sodium meta-arsenite solution are introduced into the vessel 30 which is stirred by the device including the stirrer 31, shaft 32 and motor 33. Since the freshly spent solution and the reducing solution are introduced continuously, the mixture in vessel 30 may be withdrawn by line 43 and if desired, returned to the system by way of tank 44, pump 45, and line 46 which connects into line 17 through check valve 47.

The recorder-controller 41, as a result of the titration in vessel 30, will display a reading which is proportional to the available chlorine content of the freshly spent circulating solution. Changes in this reading may be transformed in the recorder-controller 41 into air pressure variations or impulses, which are transmitted by means of line 50 to the pneumatic set of ratio controller 48. Ratio controller 48 receives from flow rate transmitter 12 by means of line 51, impulses corresponding to changes in the flow rate of sour oil introduced by line 11 and impulses corresponding to changes in the flow rate of treating solution in line 54 from flow rate transmitter 53 by means of line 59. The readings of flow rate transmitters 12 and 53 may be displayed by means of separate pens on chart 49 of ratio controller 48. Ratio controller 48 combines the impulses from flow rate transmitters 12 and 53 in a ratio controlled by its pneumatic set, and transmits the ratioed impulse, by means of line 52, to control valve 14, which admits hypochlorite solution from line 54 into line 13 and thence into line 11, and which thus serves to control the rate of flow of fresh reactivated hypochlorite solution for admixture with the sour naphtha introduced by line 11; such control allows the maintenance of a constant treat for varying naphtha charge rates until the titration recorder-controller 41 may call for a different treat due to a change in the residual available chlorine concentration in the spent solution, by an impulse transmitted through line 50 to ratio controller 48, to change the ratio setting.

Line 54 contains a pump 55 and connects into chlorinator 22 for supply of reactivated hypochlorite solution to line 13 as has been described. Variations in the setting of valve 14 caused by the ratio controller 48, in turn, will cause variations in the reading of flow rate transmitter 53 in line 54 which connects to valve 14.

These variations in reading of flow rate transmitter 53 are transmitted as pneumatic impulses to ratio controller 48 and to ratio controller 56 by means of lines 59 and 58. Ratio controller 56 further receives through line 62 pneumatic impulses from flow rate transmitter 63 in line 23 controlled by valve 61, which impulses correspond to changes in flow rate of chlorine in said line. The readings of flow rate transmitters 53 and 63 may be displayed by means of separate pens on chart 57 of ratio controller 56. Ratio controller 56 combines these impulses in a predetermined ratio, controlled by hand setting, and transmits the ratioed impulse by means of line 60 to control valve 61 in line 23 which admits chlorine into chlorinator 22. Thus the activation of the ratio controller 56 changes the setting of the valve 61 and varies the amount of chlorine introduced into the chlorinator 22 through line 23 to maintain constant chlorine concentration in the circulating hypochlorite solution.

In operating the present invention for a desired hypochlorite strength, the copper number level of the sour oil and the desired percent treat will determine the strength of the hypochlorite solution to be employed. The ratio controllers 48 and 56 will be adjusted so that valve 61 will admit the desired amount of chlorine into the chlorinator 22 and valve 14 will admit the proper amount of treating solution to contact the sour naphtha in line 11 for the desired treating operation. For a given rate of naphtha of a given copper number the settings of these instruments will be determined such that the available chlorine in the solution withdrawn by line 26 is between 0.1 and 1.0 and preferably in the range from 0.3 to 0.5 gram per liter. As long as the naphtha charge rate and copper number of the sour naphtha remain unchanged, the settings of valves 14 and 61 will not be changed once the operation of the system has reached a steady state.

It is assumed that the flow rate of the sour naphtha charged through line 11 is increased to a different value. This causes a new, higher reading to be transmitted by flow rate transmitting device 12 in line 11, through line 51, to ratio controller 48. To maintain the set ratio of treat, controller 48 will transform the changed pressure in line 51, due to the increased reading, into a corresponding pressure change in line 52, causing a change in the setting of valve 14 to increase the flow of the treating solution to maintain the required percent of treat. Then the flow rate transmitting device 53 in line 54 will respond to the increased flow rate in line 54 by transmitting a changed reading through lines 59 and 58 to ratio controllers 48 and 56. The increased reading transmitted from transmitter 53 to ratio controller 48 serves to re-establish a new steady state of operation at the desired ratio between flow in lines 11 and 54. The increased reading transmitted from transmitter 53 to ratio controller 56 is transformed into a change in pressure in line 60 to cause a change in setting of valve 61 to permit increased flow of chlorine through line 23 into chlorinator 22, so that the hypochlorite strength may be maintained at the predetermined value. Increased flow in line 23 causes a corresponding change in reading of flow rate transmitter 63, which is transmitted through line 62 to ratio controller 56, where it serves to reestablish a new steady state of operation at the desired ratio between flow of treating solution in line 54 and chlorine in line 23. The system is then stabilized at the desired level for the new charge rate.

As the mercaptan content of the sour naphtha increases to a different level while the charge rate of the sour naphtha to line 11 remains unchanged, an increase in the per cent treat will be required since the hypochlorite strength will remain fixed. As the higher copper number naphtha enters the system through line 11, it will cause the residual chlorine content of the freshly spent treating solution withdrawn by line 26 to drop. A change in the reading of the titration recorder-controller 41 results which, in turn, causes an impulse to be transmitted through pneumatic means 50 to the pneumatic set of ratio controller 48. This changes the setting of the ratio to be maintained between flow in lines 11 and 54, i. e. the percent treat, to increase the amount of treating solution to be admitted from line 54 into line 11 for a given rate of flow in line 11. On changing the set ratio, ratio controller 48 will transmit an impulse through line 52 to valve 14 in line 54 to increase the flow of treating solution until a steady operation at the new ratio has been established. The increased flow in line 54 will establish a new increased flow of chlorine through line 23, to maintain a predetermined ratio of chlorine added to the treating solution, in the manner described above.

It is possible to omit the flow rate transmitting device 12 in line 13 and ratio controller 48. In this event, the valve 14 would be controlled in direct response to variations in the readings of the titration recorder-controller 42. Under these conditions, line 50 would connect directly to the valve 14 instead of the ratio controller 48. The function of the ratio controller 56 in this modified operation would be unchanged.

"Percent treat" refers to the volume relationship of treating solution employed to sour oil treated. Thus, a treat employing one volume of aqueous hypochlorite solution, regardless of its strength, to treat ten volumes of sour oil, is called a "10 percent treat." Sweetening may be obtained in a wide range, from 1 or 2 percent to 100 percent treat or more, but 5% to 20% treat is considered a preferred range for satisfactory commercial operation.

In employing the reducing solution from tank 34 it is desirable to have a sodium meta-arsenite solution which may contain from 0.2 to 3.0 grams of sodium meta-arsenite per liter which may be employed at a rate in the range from 0.5 to 5 volumes per minute, while the spent hypochlorite solution is employed at a rate of 1.0 volume per minute.

When an aqueous solution of sodium mercaptide is used as an alkaline reducing agent, such solution may have a concentration of sodium mercaptide in the range between 0.05 and 0.74 gram of mercaptan sulfur per liter.

It is emphasized that the present invention requires the withdrawal of a freshly spent hypochlorite solution for analysis since otherwise the desirable results of the present invention are not obtained.

In order to obtain the full benefits of the present invention it is essential that the time required for a portion of the treating solution to flow from the juncture of lines 11 and 13 into vessel 30 be no more than two minutes and preferably no more than 30 seconds.

While platinum-calomel electrodes have been described in the titrating vessel 30, other electrode systems may be used such as platinum-platinum with induced polarity differential, platinum-silver, and the like.

The copper number referred to herein is determined in accordance with the method described in "U. O. P. Laboratory Test Methods for Petroleum and its Products," Universal Oil Products Company, Chicago, 1940, page H–61. This test is a measure of the mercaptan sulfur content, usually of petroleum distillates and is equivalent to milligrams of mercaptan sulfur per 100 cc. of the sample tested.

For purposes of the present description, the entire instrumentation and control has been described as a pneumatically operated system. In such a system, air under pressure, called "instrument air," is supplied to each instrument. Each reading of a process variable which is to be employed to control a valve setting is transformed by the transmitting instrument into an air pressure valve. A change in the reading of the process variable, converted by the transmitting instrument into a change in air pressure in the line leading from the transmitting instrument to the controlling instrument, is in turn converted by the control instrument into a change in air pressure in the line leading from the control instrument to the controlled valve. For purposes of the present description and claims, the changes in air pressure due to changes in process variables, as transmitted through the pneumatic system, will be referred to as pneumatic impulses.

A system entirely analogous to the one herein described may be operated electrically, employing electrical instead of pneumatic impulses, the impulses being transmitted by electrical instead of pneumatic means from transmitting instrument to control instrument to controlling means, i. e. valve. At the valve, the electrical impulse may be converted into a pneumatic impulse for actual manipulation of the valve.

In a pneumatically operated system as described, the following are typical of the transmitting and controlling instruments and controlled valves that may suitably be employed:

Flow rate transmitting instruments 12, 53, and 63 are conventional instruments such as are well known to the trade and need not be further described here.

Titration recorder-controller 41 may be an "Electronik Potentiometer Controller" as described on pages 12 and 13 of Bulletin 15–4R of the Minneapolis Honeywell Company's Brown Instrument Division, copyright 1945—The Brown Instrument Company, Philadelphia. A suitable instrument may be such a potentiometric controller with a 0–5 mv. range and a pneumatic control unit with adjustable proportional band, automatic reset, and rate action.

Ratio controller 56 may be a "Recording-Air-Operated Controller" "702P29-Series" as described on page 33 of Catalog 2221 of the Minneapolis Honeywell Company's Brown Instrument Division, copyright 1947, The Brown Instrument Company. A suitable instrument may be a controller, ratio, 2 pen recording, pneumatic receiving type, with adjustable proportional band and automatic reset.

Ratio controller 48 is similar to ratio controller 56 but in addition is provided with "pneumatic set," which means that the ratio maintained by the instrument may be varied pneumatically by the output from another control instrument, or manually. A suitable instrument is described in Catalog No. 53, Publication No. 10422, of Fischer and Porter Co.

Flow control valves 14, 21, and 61 are diaphragm-motor operated valves, such as are well known to the trade.

The nature and objects of the present invention having been completely described and illustrated what we wish to claim as new and useful and to secure by Letters Patent is:

1. In a continuous hypochlorite sweetening process in which a sour petroleum hydrocarbon feed stock is intimately contacted with an aqueous alkaline hypochlorite treating solution, said hypochlorite solution containing between about 50 and 250 grams of sodium hydroxide per liter of treating solution and between about 1 and 100 grams of available chlorine per liter of treating solution, the improvement which comprises the steps of analyzing a sample portion of said hypochlorite solution after contacting the said hydrocarbon feed stock therewith within about two minutes of the time of initial mixing of said treating solution with said sour hydrocarbon feed stock, separately settling and separating the remainder of the treating solution from said feed stock, adding chlorine to said remainder of said treating solution in response to said analysis in an amount sufficient to reactivate the same and employing said reactivated solution containing said added chlorine to contact additional quantities of said sour hydrocarbon feed stock, the amount of chlorine added in response to said analysis being sufficient to provide an available chlorine content for said sample portion within the range of about 0.1 to 1.0 grams of available chlorine per liter of sample solution.

2. In a continuous hypochlorite sweetening process in which a sour petroleum hydrocarbon feed stock is intimately contacted with an aqueous alkaline hypochlorite solution, said hypochlorite solution containing between about 50 and 250 grams of sodium hydroxide per liter of treating solution and between about 1 and 100 grams of available chlorine per liter of treating solution, the improvement which comprises separating a sample portion of said hypochlorite treating solution from contact with said hydrocarbon feed stock and contacting said sample portion within about two minutes of the time of initial mixing of said hypochlorite solution wth said sour feed stock with an aqueous sodium meta-arsenite solution under analysis conditions to obtain a voltage signal which is a measure of the available chlorine content of said sample portion, separately settling and separating the remainder of said spent hypochlorite treating solution from said feed stock, adding chlorine to said remainder of said spent solution in response to said signal in an amount sufficient to reactivate the same and employing said reactivated treating solution containing said added chlorine to contact additional quantities of said sour hydrocarbon feed stock, the amount of chlorine added in response to said signal being sufficient to provide an available chlorine content for said sample portion within the range of about 0.1 to 1.0 grams of available chlorine per liter of sample solution.

3. A method as in claim 2 in which the amount of chlorine added in response to the signal is sufficient to provide an available chlorine content for the sample portion within the range of about 0.3 to about 0.5 gram of available chlorine per liter of sample solution.

References Cited in the file of this patent

UNITED STATES PATENTS

| | | |
|---|---|---|
| 2,076,964 | Pomeroy | Apr. 13, 1937 |
| 2,526,515 | Stein | Oct. 17, 1950 |
| 2,585,811 | Marks | Feb. 12, 1952 |
| 2,608,523 | Waddell et al. | Aug. 26, 1952 |
| 2,617,439 | Fellows et al. | Nov. 11, 1952 |

OTHER REFERENCES

Marks: J. American Water Works Assn., vol. 34, No. 8, pages 1227–1239.